United States Patent [19]

Wright et al.

[11] 4,243,995

[45] Jan. 6, 1981

[54] ENCAPSULATED PIEZOELECTRIC PRESSURE PULSE DROP EJECTOR APPARATUS

[75] Inventors: Allen T. Wright, Lewisville; Kenneth H. Fischbeck, Dallas, both of Tex.

[73] Assignee: Xerox Corporation, Stamford, Conn.

[21] Appl. No.: 44,800

[22] Filed: Jun. 1, 1979

[51] Int. Cl.[3] .............................................. G01D 15/18

[52] U.S. Cl. ................................ 346/140 R; 310/328; 310/345

[58] Field of Search ............. 346/140 R, 75; 310/328, 310/326, 345

[56] References Cited

U.S. PATENT DOCUMENTS

| | | | |
|---|---|---|---|
| 2,512,743 | 6/1950 | Hansell | 346/140 X |
| 3,452,360 | 6/1969 | Williamson | 346/140 |
| 3,857,049 | 12/1974 | Zoltan | 310/328 |
| 3,927,410 | 12/1975 | Pimbley | 346/140 |
| 3,946,398 | 3/1976 | Kyser | 346/140 X |
| 4,025,928 | 5/1977 | Hou | 346/140 A |
| 4,072,959 | 2/1978 | Elmquist | 346/140 |

OTHER PUBLICATIONS

Stemme & Larsson, The Piezoelectric Capillary Injector . . . , IEEE Trans. on Electron Devices, Jan. 1973, pp. 14–19.

Hammerschmidt et al., Crystal Isolation for Ink Jet Heads, IBM Tech. Disc. Bulletin, vol. 21, No. 11, Apr. 1979, p. 4645.

*Primary Examiner*—Joseph W. Hartary

[57] ABSTRACT

A pulsed liquid droplet ejecting apparatus wherein a rectangular piezoelectric transducer is arranged abaxially over an ink containing channel with an edge in operating relationship with the channel. The edge of the transducer is held fixed so that on excitation of the transducer by an electrical pulse, the transducer extends towards the channel ejecting a drop. The piezoelectric transducer is coated with a material, which provides shear relief between the piezoelectric transducer and the ejector embedding material.

2 Claims, 3 Drawing Figures

ENCAPSULATED PIEZOELECTRIC PRESSURE PULSE DROP EJECTOR APPARATUS

The invention relates to a pulsed liquid droplet ejecting apparatus wherein a piezoelectric transducer is arranged abaxially to an ink channel so that when the transducer is excited, it expands in the direction of the channel compressing it and the liquid therein. Specifically, the invention relates to an improved ejecting apparatus wherein the piezoelectric transducer is coated with a material, which will provide shear stress relief between the transducer and the material is which the coated transducer is embedded.

The invention can be utilized in any pressure pulse drop ejector apparatus; however, the greatest benefits are realized when the ejector apparatus of this invention is used in an ink jet recording system. Accordingly, the present invention will be described in connection with an ink recording system.

Ink jet recorders are well known in the art, many commercial printer units being on the market. Generally, these ink jet printers utilize a piston-like push-pull action to eject ink drops from a small nozzle to form an image. Typically, a piezoelectric transducer is used to provide the piston-like action. A piezoelectric transducer is a device that converts electrical energy into mechanical energy. In U.S. Pat. No. 2,512,743 to C. W. Hansell, issued June 27, 1950, an ink jet was described in which the circular peizoelectric transducer was used in an extensional mode, the extension being along the axis to drive ink. The piezoelectric transducer was arranged coaxially with a conical nozzle, the axial extension being used to create pressure waves causing expression of droplets from the nozzle. Several other transducer arrangements have been proposed. A basic arrangement was disclosed in an article, "A Piezoelectric Capillary Injector—A New Hydrodynamic Method for Dot Pattern Generation", by Eric Stemme and Stig-Göran Larsson, *IEEE Transactions on Electron Devices,* January, 1973, pages 14–19. In that disclosure, a system is disclosed in which a bilaminar piezoelectric metal disk is used to drive ink coaxially with the bilaminar disk. In that system, application of an electrical voltage pulse across the disk causes an inward, that is, towards the ink, center deflection, which forces ink droplets out of an orifice. U.S. Pat. No. 3,946,398, issued Mar. 23, 1976, shows a similar device; however, as disclosed in that patent, the center deflection of the disk is used to eject ink through an orifice, the axis of drop ejection being perpendicular to the axis of the disk.

Two other arrangements are shown in U.S. Pat. No. 3,857,049, issued Dec. 24, 1974. In the arrangement shown in FIG. 1 through FIG. 4 of that patent, a tubular transducer surrounds a channel containing the ink, and the transducer, when excited by application of an electrical voltage pulse, squeezes the channel to eject a drop. As shown in FIG. 6 of that patent, there is disclosed a system in which the radial expansion of a disk in response to an electrical voltage pulse is used to compress ink in circumferential channels thereby forcing ink droplets out of a nozzle. Other arrangements are also known. The reason why so many arrangements exist is that experimenters are striving to provide ink jet ejectors, which are economical to produce, reliable in operation and sufficiently compact to be capable of being used in a printer array. An optimum design for a nozzle, for example, would provide an ejector, which would be easy to clean and prime. Further, the design would have to be such that entrained air bubbles could readily be removed.

An ejector apparatus which provides many, if not all of the above advantages, has been described in commonly assigned copending application Ser. No. 33,090, filed in the U.S. Patent and Trademark Office Apr. 25, 1979, by Stig-Göran Larsson and entitled "A Pressure Pulse Drop Ejector Apparatus". In this arrangement, a rectangular transducer is arranged abaxially to an ink containing channel. On application of an electrical voltage pulse across the width of the transducer, the transducer expands into the ink containing channel ejecting a drop therefrom. Although very useful, it has been found that after prolonged use, failures occurred in the flexible membrane between the piezoelectric member and the ink channel. The pounding action caused by the push-pull motion of the piezoelectric member against the flexible membrane caused it to fail, for example, by cracking allowing ink to contact the transducer.

The invention as claimed is intended to provide a remedy. It solves the problem of how to design a pressure pulse drop ejector wherein a substantially rectangular piezoelectric member is arranged abaxially to an ink containing channel, which will operate for a prolonged time without failures at the interface between the piezoelectric transducer and the ink channel. This improvement is obtained by coating the piezoelectric member with a material that adheres strongly to the transducer but will allow shear relief between the coating material and the surrounding relatively rigid material. Further, the invention as claimed provides an ejector apparatus, which does not require the use of a flexible membrane between the piezoelectric transducer and the ink channel.

The invention is described in detail below with reference to the drawings, which show two different representative embodiments for the pressure pulse drop ejectors of the present invention wherein.

Figure 1:
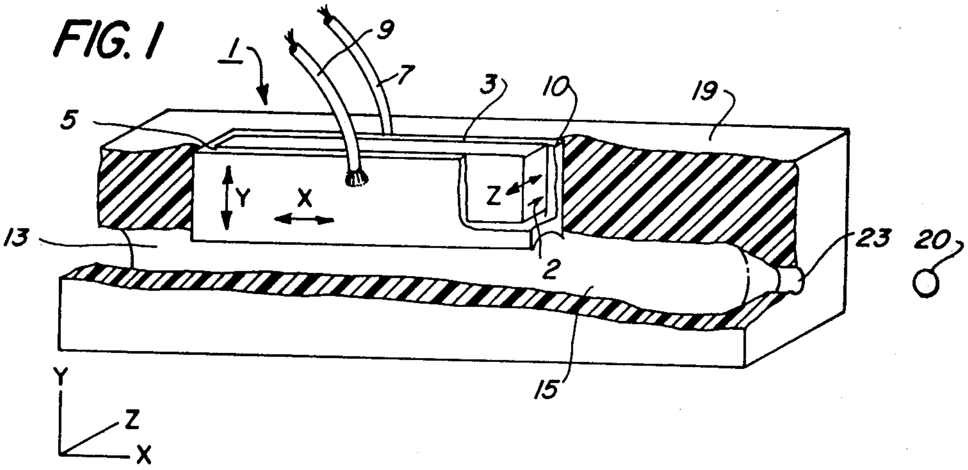
FIG. 1 is a cross-sectional perspective representation of an embodiment of the present invention.

Referring now to FIG. 1, there is shown peizoelectric member generally designated 1. Piezoelectric member 1 is coated on surfaces 3 and 5 with a conductive material. An electric voltage pulse generator (not shown) is connected to conductive surfaces 3 and 5 by electrical lead wires 7 and 9. Piezoelectric member 1 is polarized in the Z dimension, direction 2, during manufacture so that application of an electric field in a direction opposite to the polarization direction 2 causes piezoelectric member 1 to contract in the Z direction. That is, the piezoelectric transducer becomes thinner in the Z dimension. When this occurs, piezoelectric member 1 expands or extends in both the X and Y dimensions. The planar movement of the ends and edges of the rectangular piezoelectric member 1, away from the center of the member, is referred to herein as in-plane extensional movement. The piezoelectric member 1 is extended in the X and Y dimensions when excited by electric voltage pulse applied between electrical leads 7 and 9. In the present invention, one edge 4 (FIG. 2) of transducer 1 is held rigidly in place by encapsulating material 19. The Y dimension expansion of piezoelectric member 1 can, therefore, cause extensional movement only in a direction away from the rigid material 19. The piezoelectric member 1 of this invention is coated with a material 10, which is a flexible insulating compound capable of providing shear relief between the transducer 1 and relatively rigid encapsulating material 19. The Y direction extensional movement of piezoelectric member 1 is accordingly transmitted through coating 10 directly into channel 15. This eliminates the requirement for a flexible membrane between piezoelectric member 1 and chamber 15. The Y direction movement of piezoelectric member 1 towards ink chamber 15 causes sufficient buildup of pressure in ink 13 to expel a drop 20 from orifice 23.

Figure 2:
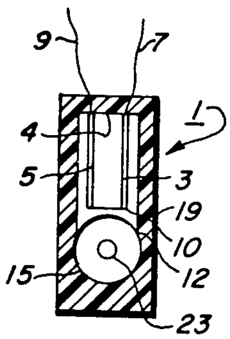
FIG. 2 is a cross-sectional end view of an embodiment of the invention utilizing an enlarged "foot" area.

Referring now to FIG. 2, there is shown piezoelectric member 1, which has been coated on its sides with conductive material 3 and 5 and further coated with relatively flexible insulating material 10. The material 10 is removed from edge 4 to provide a more rigid contact between piezoelectric member 1 and fixed block 19 than would be obtainable if material 10 was present between transducer member 1 and block 19. The Y direction movement is thus accordingly transmitted towards channel 15. However, to increase the volume deformation obtainable from piezoelectric member 1, material 10 is further coated with an outer layer 12 to increase the effective area of contact between piezoelectric member 1. The volume deformation obtainable from the in-plane extensional mode transducer can be approximated using the following equation:

$$\Delta V = -1_x 1_y w (d_{31}E + \frac{w}{1_z} s_{11}E_p)$$

wherein ΔV is the volume deformation; p is the pressure in the ink; E is the electric field applied to piezoelectric member 1; $1_x 1_y$ and $1_z$ are the length, height and thickness of piezoelectric member 1; w is width of material 12, which contacts the channel 15; $s_{11}E_p$ is the compliance constant of the piezoelectric material; and $d_{31}$ is the piezoelectric constant of the piezoelectric material.

It can be seen from the equation that the pressure applied to ink 13 and the volume deformation can be independently controlled through the control of width of material 12 and by separately controlling the X, Y and Z dimensions of piezoelectric member 1.

Figure 3:
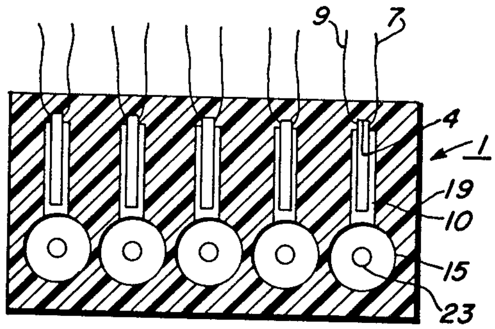
FIG. 3 shows a cross-sectional end view of an array of ejectors utilizing the FIG. 1 embodiment.

FIG. 3 shows how an array of ink jets could be arranged utilizing the improved in-plane extensional mode transducer of this invention. In this case, as many ejectors as desired may be placed in side-by-side relationship to form an array. Such an array would be useful in a high-speed printer.

By way of example, an ejector is made up of piezoelectric member made of piezoceramic PZT-5, available from Vernitron Piezoelectric Division, Bedford, Ohio, and measures 0.25 mm thick by 5 mm high by 15 mm long and comes coated with poled electrodes. The piezoelectric member 1 is coated with urethane CPC-39, available from Emerson & Cuming, Inc., Canton, Massachusetts, to a thickness dry of approximately 0.3 mm. Optionally, as explained above, the piezoelectric member 1 may be further coated with an approximately one or two micron layer of mold release agent Canie 1080, available from Camie-Campbell, Inc., St. Louis, Missouri. Edge 4 of peizoelectric member 1 is either not coated originally, or, if coated, the coating is scraped off so that piezoelectric member 1 is held firmly by block 19. Block 19 is made of epoxy Stycast 1266 or 1267, available from Emerson & Cuming, Inc., Canton, Massachusetts. Channel 15 in encapsulating material 19 measures appoximately 0.75 mm in diameter and tapers to an orifice 23 of about 50 micrometers. A potential application of about 50 volts at a frequency of about 8 kilohertz has been found useful in a printer environment. Material 19, which encapsulates the channel 15 and piezoelectric member 1, is also made of epoxy Stycast 1266 or 1267.

Although specific embodiments and components have been described herein, it will be understood by those skilled in the art that various changes in the form and details may be made therein without departing from the spirit and scope of the invention. For example, piezoelectric member 1 could be replaced by an electrostrictive or magnetostrictive member.

What is claimed is:

1. A pulsed liquid droplet ejecting apparatus wherein a substantially rectangular piezoelectric transducer is utilized in the in-plane extensional mode, comprising a piezoelectric transducer having conductive sidewalls connectable to a source of electrical voltage through electrical leads, a channel positioned to be acted upon by a first substantially linear edge of said piezoelectric transducer upon application of electrical voltage to said sidewalls to expel ink from an orifice, said piezoelectric transducer and said channel being encapsulated, and said piezoelectric transducer being positioned abaxially to said channel; characterized in that said piezoelectric transducer is at least partially coated with a material which will allow shear relief between said piezoelectric transducer and said encapsulating material.

2. The apparatus as claimed in claim 1 and further including a second layer of material coated on said piezoelectric transducer to increase the effective area of contact between said piezoelectric transducer and said channel.

* * * * *